A. A. BENDER.
PLASTER BOARD MACHINE.
APPLICATION FILED DEC. 22, 1910.

1,003,322.

Patented Sept. 12, 1911.

Witnesses

Inventor
Adolph A. Bender
By Chandler & Chandler
Attorney

A. A. BENDER.
PLASTER BOARD MACHINE.
APPLICATION FILED DEC. 22, 1910.

1,003,322.

Patented Sept. 12, 1911.
7 SHEETS—SHEET 7.

Witnesses

Inventor
Adolph A. Bender,
By
Attorneys

UNITED STATES PATENT OFFICE.

ADOLPH A. BENDER, OF CHEYENNE, WYOMING.

PLASTER-BOARD MACHINE.

1,003,322.

Specification of Letters Patent. Patented Sept. 12, 1911.

Application filed December 22, 1910. Serial No. 598,800.

*To all whom it may concern:*

Be it known that I, ADOLPH A. BENDER, a citizen of the United States, residing at Cheyenne, in the county of Laramie, State of Wyoming, have invented certain new and useful Improvements in Plaster-Board Machines; and I do hereby declare the following to be a full, clear, and exact description of the invention, such as will enable others skilled in the art to which it appertains to make and use the same.

This invention relates to that type of machinery which is employed in the manufacture of what is known as plaster board wherein a mixture of fiber and plaster of Paris is deposited on a moving web of paper or the like is then flattened and compacted to form a board-like structure.

The principal object of the invention is to improve the general construction of machines of this character.

A second object of the invention is to provide an improved mold table for devices of this character.

A third object of the invention is to provide an improved mechanism for feeding the fiber to the moving web.

A fourth object of the invention is to provide an improved mechanism for feeding and mixing the plaster of Paris.

A fifth object of the invention is to provide an improved finishing device for use with machines of this description.

A sixth object of the invention is to provide an improved trimming and cutting mechanism for use with plaster board machines.

With the above and other objects in view as will be hereinafter apparent the invention consists in general of certain novel details of construction, combinations of parts, and arrangement of mechanism hereinafter fully described, illustrated in the accompanying drawings and specifically set forth in the claims.

In the accompanying drawings, like characters of reference indicate like parts in the several views, Fig. 16 is a section on the line 16—16 of Fig. 1.

In the general construction of this machine there is employed a traveling mold table indicated in general at A above which and at one end thereof is positioned a paper roll B as shown, the table traveling in such direction that its upper side constantly moves away from the paper roll B. Adjacent this paper roll and above the table is a fiber feeder indicated in general at C following which is the plaster feeding and mixing mechanism D just beyond which is the finishing mechanism E. Adjacent the other or delivery end of the table A is the trimming and cutting roll F.

The invention is preferably so arranged that it may have a portion of the mechanism seated in a pit 20 above which is a frame 21. At one end of the pit 20 is located a drum 22. This drum is carried on a shaft 23 arranged for connection to some power mechanism as a belt, motor, or the like, this shaft constituting the main or driving shaft for the entire mechanism. At the opposite end of the machine there is provided a pair of arcuate guide rails 24 and these guide rails are continued toward the delivery or power end of the machine by straight rails 25, the latter terminating in arcuate portions 26 at the delivery end of the machine. Below the central portion of these guide rails and extending beneath the lower ends of the respective rails 24 and 26 but in spaced relation thereto are still further guide rails 27. Over these guide rails and the drum 22 runs the molding table which consists of a series of cars which are preferably termed mold cars. Each of these cars is in the form of a body 28 which is provided with grooved wheels 29 running on the guide rails just described, the arrangement being such that when the cars are passing along the lower string they will run in inverted position on the rails 27 and will be guided to their obverse position by the guide rails 24. Each of these cars is provided with a centrally disposed depending lug or tooth 30 which is arranged to be engaged by a bar or pin 31 connecting the webs of the drum 22. These cars are connected in series by means of links 32 disposed at the sides of the cars and pivotally connected thereby. By this means the rotation of the drum causes the mold cars to move along the upper guide rails from the paper roll and to the delivery end of the machine.

Extending across the frame 21 is a bar or shaft 33 whereon is carried a roll of paper 34, the roll being so positioned that the paper is fed off from its underside and onto the mold table previously described. As the paper passes along this mold table fiber is deposited thereon from the fiber feeder C. This fiber feeder comprises a hopper 35 within which is arranged a pair of plates 36 the plates being hinged at their upper edges to the front and rear walls of the hopper. Behind each of these plates adjacent its lower end is a roller 37, the shafts of which pass through the slots 38 formed in the side walls of the hopper and the projecting ends of these shafts are connected on each side of the hopper by a pair of links 39, said links being pivotally united centrally between the two shafts and having the pivot point attached to the lower ends of screws 40 which pass up through guides 41 at the top of the hopper and have upon their upper ends thumb or adjusting nuts 42, by means of which the screws can be moved so that the central portion or pivot point of the connecting links may be raised thus drawing the rollers 37 closer together or may be permitted to drop thus allowing the rollers to move apart. It is to be particularly noted that the two plates 36 are not set in the same inclination, one of the plates being considerably steeper than the other and that the arrangement of the links and adjusting screws is such that no matter what the adjustment may be this difference in inclination will always be maintained between the two plates. It is also to be noted that these plates are so arranged that by proper manipulation of the adjusting nuts the edges of the plates may be brought together so that the hopper may be shut off from that portion of the device beneath the same.

Figure 1:
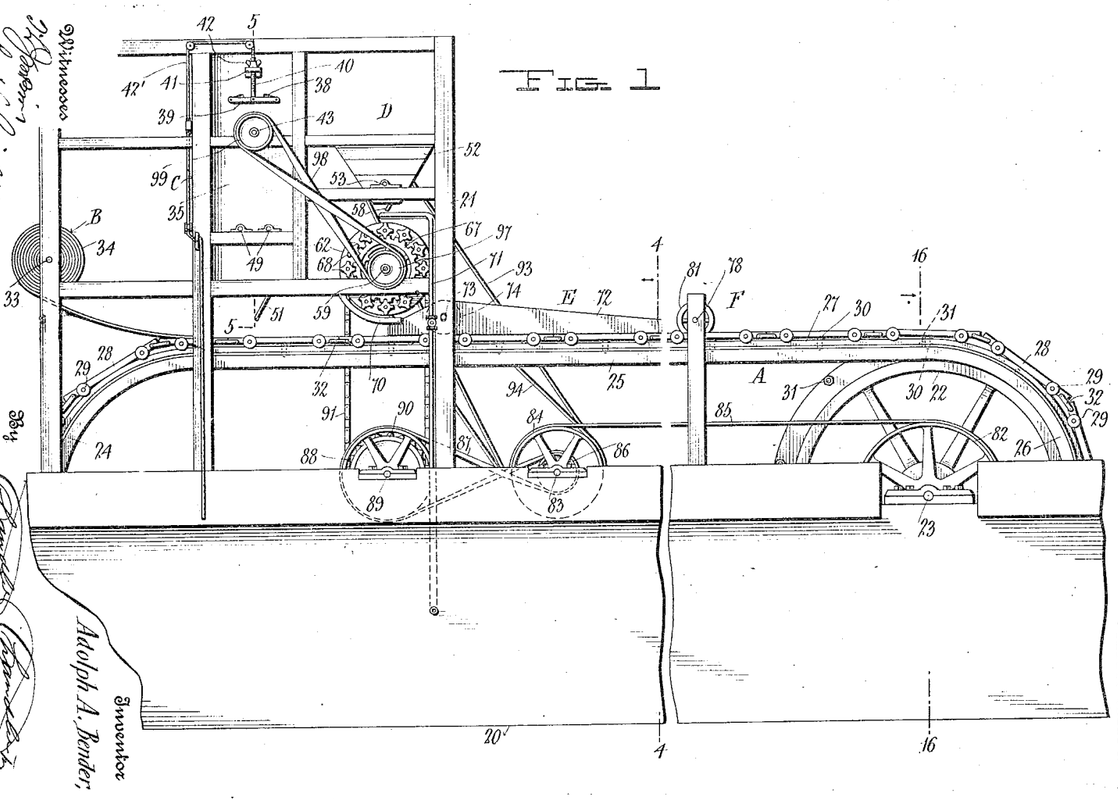
Figure 1 is a side elevation of a plaster board machine constructed in accordance with this invention, the central portion of the machine being broken away in order to permit a showing on a large scale.
Figure 2:
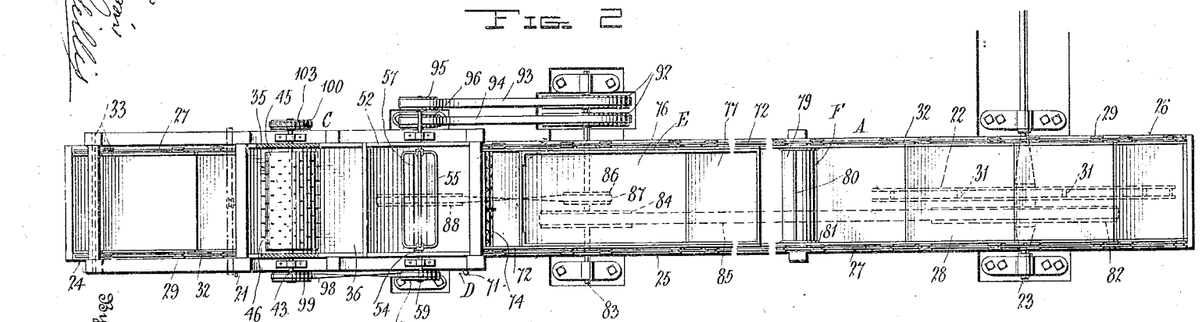
Fig. 2 is a plan view broken away in a similar manner to Fig. 1.

In order that the plates may be completely closed together when desired, an approximately Y-shaped draw member 42' is trained over suitable sheaves on the frame, the branches of this member being terminally connected to the screws 40, and the shank of the member wound about a cleat or similar securing means attached to the frame. A downward pull upon the draw member will close the plates together as will be readily understood. This construction is best shown in Fig. 1.

Immediately beneath the plates 36 and in vertical alinement with the screws 40 is a shaft 43. On this shaft adjacent each side wall of the device is a spider 44 whereon is supported a series of bars constituting a drum 45 and this drum is provided with a multiplicity of curved disintegrated teeth 46 the teeth being inclined and curved in the direction of rotation of the drum so that as the fiber passes down through the valve plates 36 it is pulled to pieces and fed downward by the rotation of the drum. The fiber from this drum drops upon a baffle or guide plate 47 and passes from this guide plate between a pair of toothed drums 48 carried on shafts 49 both of these drums being arranged to revolve in the same direction. For the purpose of preventing any of the fiber from being shot over the drums a second baffle plate 50 is provided which extends from the opposite end wall downward and inward. Beneath the drums 48 are other baffle plates 51 which are so arranged that the fiber in passing therefrom falls in a direction inclined against the movement of the paper and the lowermost of these plates 51 is positioned adjacent the upper surface of the mold table.

After the fiber has been deposited on the moving web of paper a plaster of Paris mixture is then deposited on the sheet of fiber. To effect the proper mixing and deposition of this plaster of Paris there is provided a hopper 52 wherethrough passes a transverse shaft 53 at each end of which is a hub 54 and connecting these hubs are U-shaped scraper and agitator blades 55. The bottom of the hopper 52 is rounded as at 56 and is provided with a valved opening 57 wherefrom extends a guide plate 58. Immediately beneath the hopper is a mixing device and this mixing device comprises a transverse shaft 59 whereon is mounted a pair of spiders 60 having a drum 61 formed therearound. At each end of the drum 61 are flanges 62 and between the flanges 62 is a series of semi-circular buckets 63 so arranged that the plane passing through the edges of each bucket will be radial to the axis of the drum. Extending through the flanges 62 are a series of shafts 64 each of said shafts being concentric with a respective bucket. On each of these shafts is mounted a pair of hubs 65 and the hubs of each pair are connected by a series of U-shaped beater arms or bars 66, the ends of the legs of the U-shaped members being connected to respective hubs. On the shaft 59 is a gear wheel 67 and on each of the shafts 64 is a pinion 68. The gear wheel 67 is keyed to the shaft while the drum 61 is free to revolve thereon. Attached to the drum 61 is a sprocket wheel 69 and carried upon the shaft 59 is a belt pulley 70. Now by means of certain belting arrangements to be hereinafter described the shaft is given a rotation in the direction opposite to that in which the drum rotates, the latter being rotated so that the open sides of the buckets are always foremost during the movement. By this means the pinions 68 with their shafts and beaters are caused to revolve very rapidly while the drum as a whole moves slowly around. Beneath the rear side of the mixing mechanism is a flanged guard plate 70.

At 71 is shown a water supply pipe and this pipe extends laterally across the drum of the mixing mechanism being provided with a series of spaced delivery openings on its underside so that water flowing therefrom falls into the successive buckets 63 as the drum is rotated. Now when the plaster is delivered from the hopper it is of course in a dry state and it passes down the guide plate 58 into the pockets 63 where it comes in contact with the water which has already been provided through the pipe 71. By reason of the provision of the agitators or beaters 66 the water and plaster are there thoroughly mixed and the mixed mass passes down over the plate 70 being carried along said plate by the rotation of the pockets. From the plate 70 it passes onto the sheet of fiber which has been deposited on the paper. When the plaster is thus deposited on the fiber it is of course in a more or less irregularly disposed state and to provide for having the plaster both of uniform thickness as well as to insure the compacting of the plaster and fiber there is attached to each side of the member 70 a plate 72, this plate acting as a further guard to prevent any of the plaster from falling sidewise from the web of paper. Extending between the plates 72 is a vertically movable shaft 73 whereon is freely revoluble a hollow drum preferably of cast iron as indicated at 74. This drum is provided with a multiplicity of perforations 75. The drum 74 is so arranged as to bear upon the mold table but to rise and ride on the plaster board advancing over the mold table. Now as this plaster board leaves the drum the perforations which are necessary for the perfect mingling of the fiber leaves impressions thereon which are objectionable. For the purpose of removing these impressions the two plates 72 are connected by a smoothing plate or slicker 76 which is inclined downwardly from a point adjacent the drum 74 and terminates in a parallel or horizontal portion 77 which is precisely a distance from the mold table equal to the thickness of the plaster board to be manufactured.

After leaving the slicker the board passes along the table which is of such length that during the passage the plaster has sufficient time to take at least an initial set. The board, now completed except for trimming and cutting to size then passes beneath trimming and sizing mechanism F. This device consists of a shaft 78 mounted in suitable bearings adjacent the delivery end of the frame and on the shaft is a drum 79 having a knife 80 carried thereby and projecting therefrom. The circumference of this drum is so proportioned as to be equal to the length of the required plaster board while its length is equal to the width of such board. At each end of the drum is secured an annular trimming or gaging knife 81 so that as the board passes beneath the drum 79 the knives 81 trim the edges while each time the knife 80 comes around the board is divided into sections of uniform length.

Figures 3, 15:
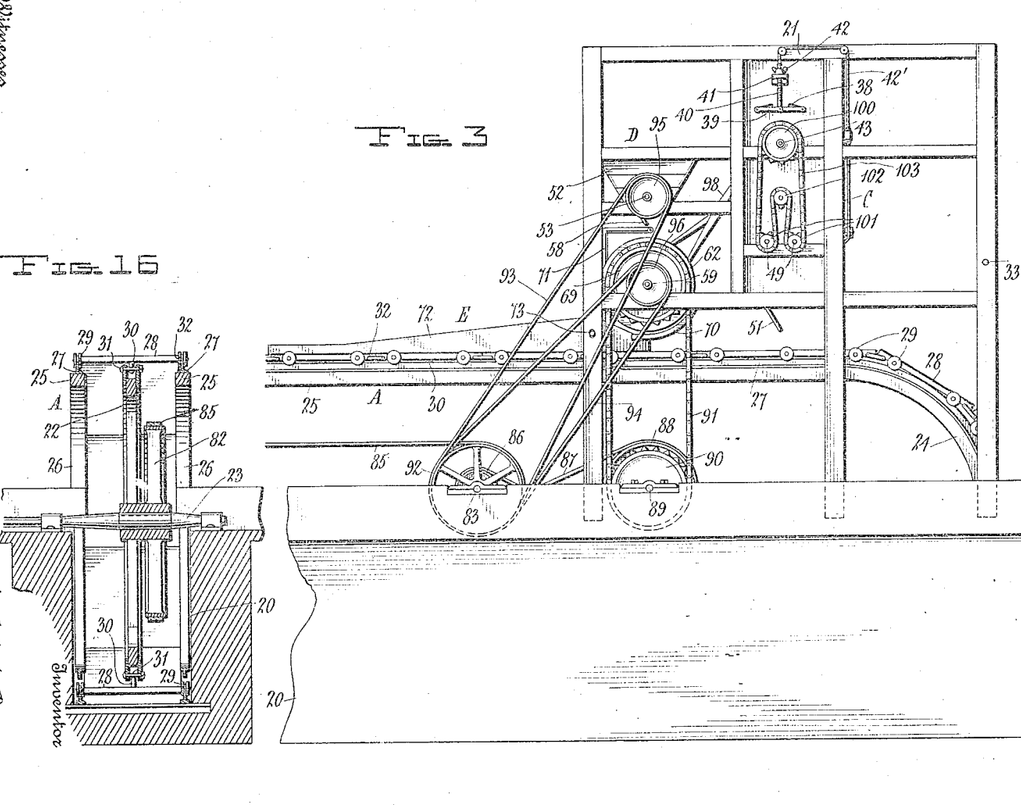
Fig. 3 is a side elevation of a portion of the machine taken from the side opposite to Fig. 1.
Fig. 15 is a section on the line 15—15 of Fig. 14.
Figure 4:
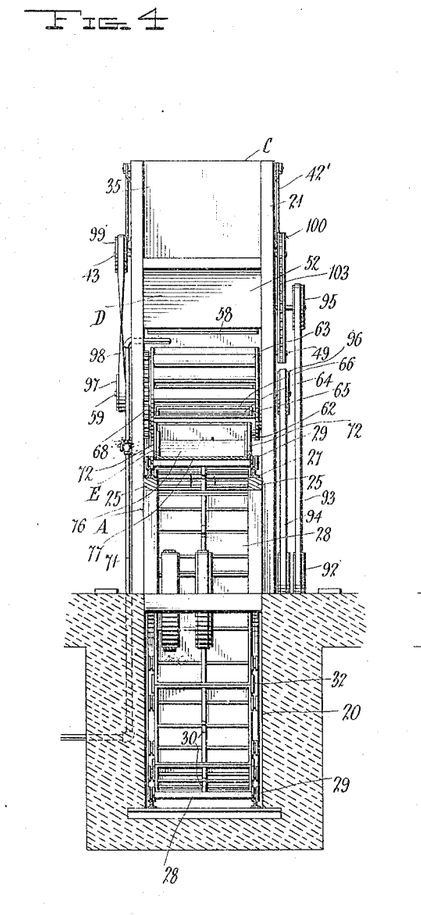
Fig. 4 is a section on the line 4—4 of Fig. 1.
Figure 5:
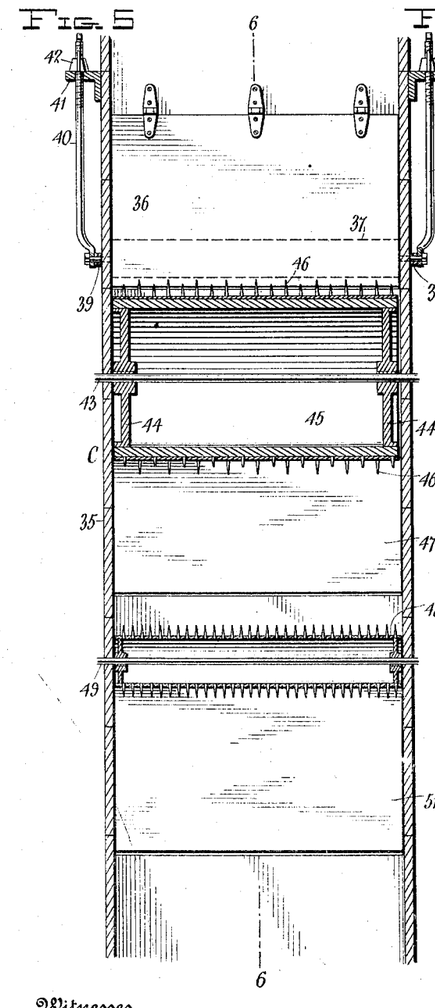
Fig. 5 is an enlarged section on the line 5—5 of Fig. 1.
Figure 6:
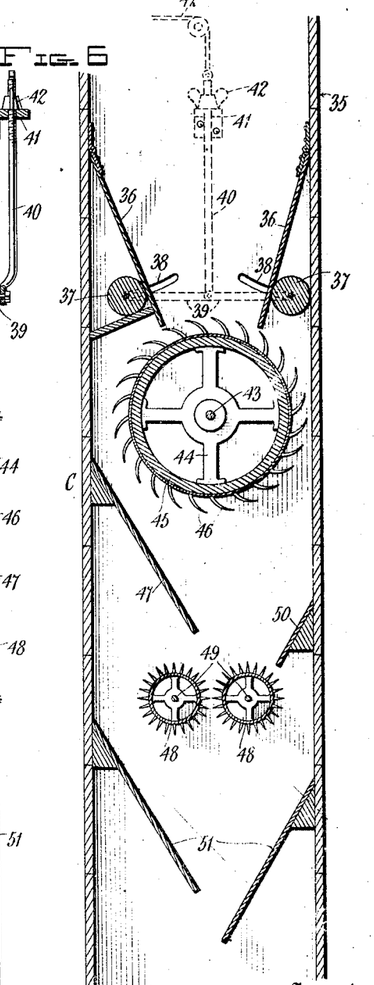
Fig. 6 is a section on the line 6—6 of Fig. 5.
Figure 7:
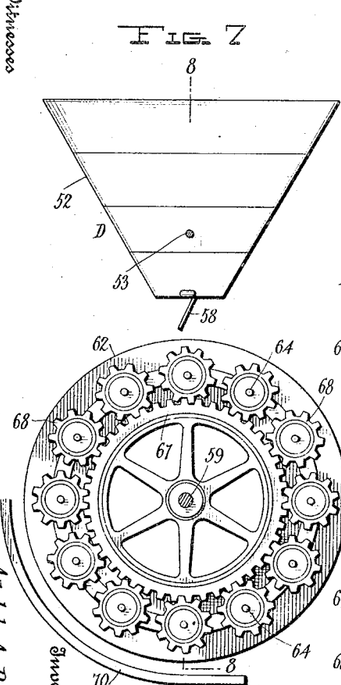
Fig. 7 is an enlarged side elevation of the plaster of paris feeder and mixer.
Figures 8, 9:
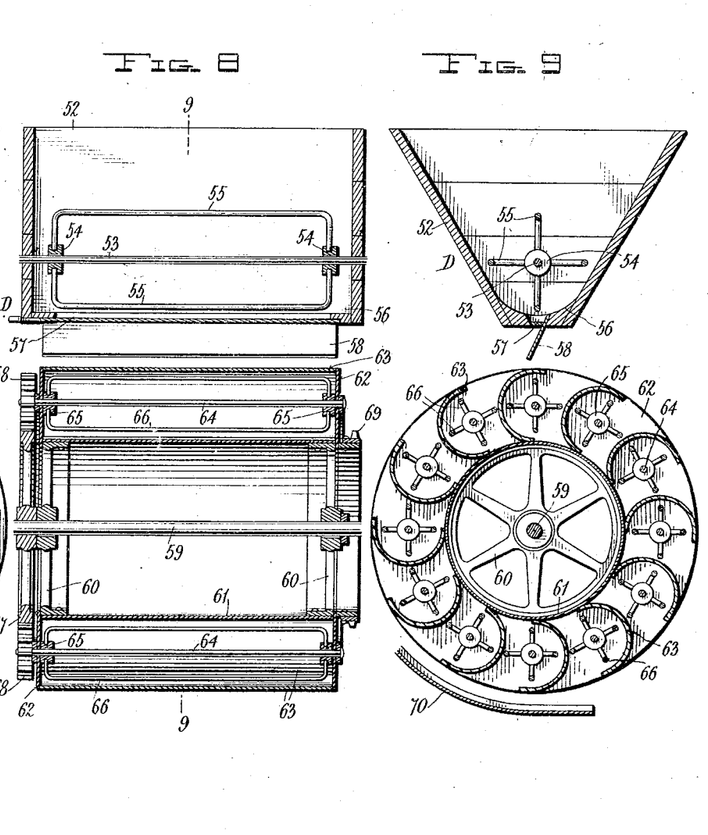
Fig. 8 is a section on the line 8—8 of Fig. 7.
Fig. 9 is a section on the line 9—9 of Fig. 8.
Figure 10:
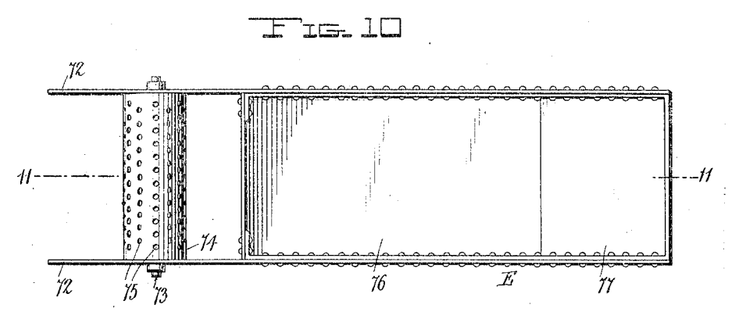
Fig. 10 is an enlarged detail plan view of the finisher.
Figure 11:
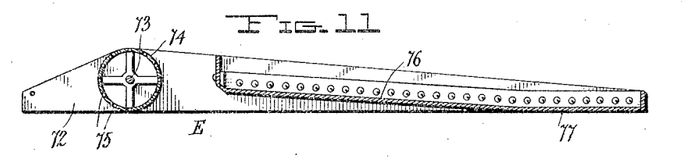
Fig. 11 is a section on the line 11—11 of Fig. 10.
Figure 12:
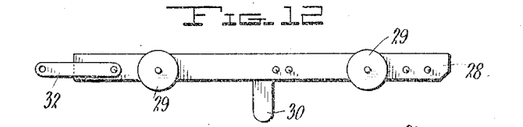
Fig. 12 is an enlarged detail side elevation of one of the links of the chain mold.
Figure 13:
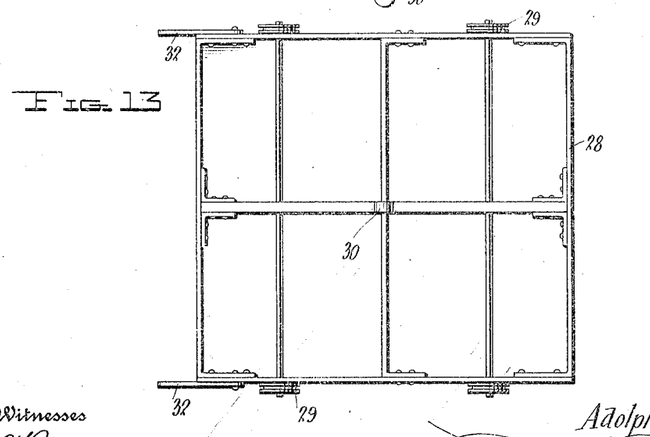
Fig. 13 is an enlarged plan view of the mold link shown in Fig. 12.
Figure 14:
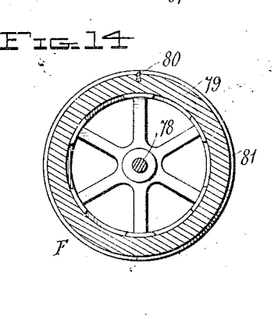
Fig. 14 is an enlarged cross section through the cutting roll.
Figure 15:
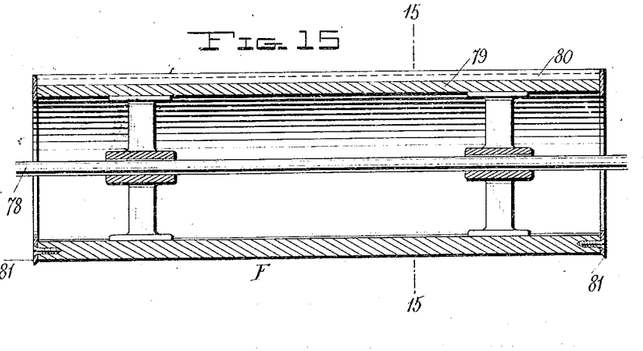
Figure 17:
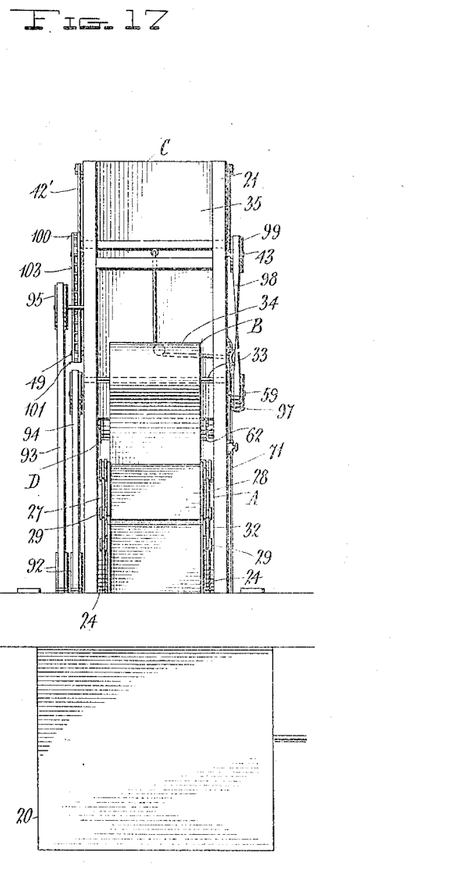
Fig. 17 is an end elevation of the machine.

On the shaft 23 is a belt wheel 82 and carried on a jack-shaft 83 is a belt wheel 84 connected to the belt wheel 82 by a belt 85 the arrangement being such that the two shafts revolve in the same direction. On the shaft 82 is a second belt wheel 86 and from this belt wheel a crossed belt 87 extends around a belt wheel 88 carried on a shaft 89. On this shaft 89 there is also provided a sprocket 90 and a chain 91 operatively connecting the sprocket 90 and the sprocket 69 of the mixer. On the shaft 83 are further belt wheels 92 which are connected respectively by belts 93 and 94 to belt wheels 95 and 96 carried on the respective shafts 53 and 59. The shaft 59 is provided with a further belt wheel 97 which is connected by a crossed belt 98 with a belt wheel 99, fixed upon the shaft 43, this belt wheel serving to drive the fiber feeder. On the shaft 43 is also provided a belt wheel 100 and each of the shafts 49 is provided with a belt wheel 101 while between the two latter and the wheel 100 is an idler belt wheel 102. A belt 103 is led around the belt wheels just described in such manner that the belt wheels 101 are revoluble in the same direction as may be seen by reference to Fig. 3.

In the operation of this invention the specific details have already been set forth but in general it may be stated that when the machine is set in motion the paper is carried by the mold table toward the delivery end of the machine and that during the passage of the paper there is first deposited thereon a layer of fiber from the fiber feeder. On top of the layer of fiber there is deposited a layer of thoroughly mixed plaster which is compacted by a hollow perforated roller and passed to a slicker after which it is moved along toward the delivery end and takes an initial set during its passage. On arriving adjacent the delivery end the now formed board has its edges trimmed and is cut to proper length by the trimming and cutting roll. At the delivery end the boards are taken off by the attendant and passed on suitable racks and stacked for delivery.

There has thus been provided a novel and improved device of the kind described and for the purpose specified.

What is claimed is:—

1. In a plaster board machine, the combination with a mold table comprising an endless chain of molds and means to support and move the same; of a frame provided with means to support a roll of paper, a fiber feeding mechanism in operative relation to the mold table, a plaster feeding mechanism, a fluid supply beneath the plaster feeding mechanism, a plaster mixing device beneath said fluid supply and the plaster feeding mechanism, a compacting roll, a slicker in operative relation to the mold table, and operative connections between the feeding mechanisms, the mixing device and the table moving means.

2. In a device of the kind described, a fiber feeder comprising a hopper having a pair of guide plates dependingly hinged to the side walls thereof and forming a mouth for the hopper, a toothed feeding roll below the mouth of the hopper, guide plates beneath said roll, and a pair of disintegrator rolls positioned to receive the material passing from the last mentioned guide plates.

3. In a device of the kind described, a fiber feeder comprising a hopper having a pair of guide plates dependingly hinged to the side walls thereof and forming a mouth for the hopper, a toothed feeding roll below the mouth of the hopper, guide plates beneath said roll, a pair of disintegrator rolls positioned to receive the material passing from the last mentioned guide plates, and means to vary the distance between the lower edges of the hinged plates.

4. In a device of the kind described, a fiber feeder comprising a hopper having a pair of guide plates dependingly hinged to the side walls thereof and forming a mouth for the hopper, a toothed feeding roll below the mouth of the hopper, guide plates beneath said roll, a pair of disintegrator rolls positioned to receive the material passing from the last mentioned guide plates, and means to vary the distance between the lower edges of the hinged plates, said means comprising a pair of rollers behind said hinged plates having axles extending through slots formed in the hopper, pairs of pivotally connected links each pair of links connecting respective ends of the rollers, and elements to hold the links of each pair in adjusted angular relation.

5. In a device of the kind described, a fiber feeder comprising a hopper having a pair of guide plates dependingly hinged to opposed walls of the hopper and forming a mouth for the hopper, a feeding roll beneath the mouth of the hopper and having its axis displaced laterally of the hopper, and means to vary the distance between the lower edges of the guide plates, said means being arranged to constantly hold one of said plates at a greater angle to the horizontal than the remaining plate.

6. In a device of the kind described, a fiber feeder comprising a hopper having a pair of guide plates dependingly hinged to opposed walls of the hopper and forming a mouth for the hopper, a feeder roll beneath the mouth of the hopper and having its axis displaced laterally of the hopper, and means to vary the distance between the lower edges of the guide plates, said means being arranged to constantly hold one of said plates at a greater angle to the horizontal than the remaining plate and comprising a pair of rollers behind said guide plates and having axles extending through slots formed in the hopper, pairs of pivotally connected links, each pair of links connecting respective ends of the rollers and the links being of equal length, and elements to move the pivotal points of said links vertically.

7. In a plaster board machine, an endless carrier, means for supplying a web of paper to said endless carrier, means for discharging fiber on said web, and a mixer adapted to supply the fiber covered web with a plastic material, said mixer comprising a frame, a drum rotatably mounted therein, a series of buckets engaged around the periphery of the drum, an agitator operatively mounted in each of said buckets, means to rotate the drum, and other means to rotate the agitators during the rotation of the drum.

8. In a plaster board machine, an endless carrier, a web of paper riding on said endless carrier, means for supplying a layer of fiber upon said web, and a mixer above said web supplying a plastic material to the web after application thereto of said fiber, said mixer comprising a frame, a drum shaft journaled in said frame, a drum rotatably mounted on said shaft, a series of buckets arranged around the periphery of the drum, an agitator shaft extending through each bucket, a driving gear on the drum, a gear on each of the agitator shafts meshing with the driving gear, and means to rotate said drum and drum shaft independently.

9. In a plaster board machine, an endless carrier, a web of paper riding on said endless carrier, means for disposing a layer of fiber on said web, in combination with a mixer for disposing a plastic material on said layer of fiber, said mixer comprising a frame, a drum shaft journaled in said frame, a drum rotatably mounted on said shaft and provided with a peripheral flange at each end, a series of buckets arranged around the periphery of the drum, each bucket extending longitudinally of the drum from one of said flanges to the other, an agitator shaft extending through each of the buckets and journaled in said flanges, a driving gear fixed on said drum shaft, a driven gear on each agitator shaft meshing with said driving gear, and means to rotate said drum and drum shaft independently.

In testimony whereof, I affix my signature, in presence of two witnesses.

ADOLPH A. BENDER.

Witnesses:
P. L. LARIVER,
LAURENCE MCGUIRE.